United States Patent [19]

Pizzuti et al.

[11] 4,109,264

[45] Aug. 22, 1978

[54] BATTERY MOUNT FOR COLLAPSIBLE CAMERAS

[75] Inventors: Donato F. Pizzuti, Saugus; Irving S. Lippert, Lexington, both of Mass.

[73] Assignee: Polaroid Corporation, Cambridge, Mass.

[21] Appl. No.: 719,840

[22] Filed: Sep. 2, 1976

[51] Int. Cl.² ............................................. G03B 17/04
[52] U.S. Cl. ...................................... 354/187; 354/288
[58] Field of Search ..................... 354/187, 202, 288; 429/98

[56] References Cited

U.S. PATENT DOCUMENTS

| 301,266 | 5/1943 | Küppenbender et al. | 354/187 |
| 3,511,146 | 5/1970 | Finelli et al. | 354/288 |

Primary Examiner—L. T. Hix
Assistant Examiner—M. L. Gellner
Attorney, Agent, or Firm—David R. Thornton

[57] ABSTRACT

A battery mount for collapsible cameras of the type in which a forwardly disposed shutter housing is connected to a rearwardly oriented film housing by a collapsible bellows. Electrical equipment contained within or supported by the shutter housing is supplied with electrical energy from batteries mounted on the rear face of the shutter housing within the bellows in the manner to be accessible through a displaceable cover of the rear housing, particularly when the camera is collapsed with the shutter housing in reasonably close proximity to the film housing. The battery mount features a readily accessible retaining clip which is releasable for replacement of batteries directly through the cover of the film housing.

4 Claims, 6 Drawing Figures

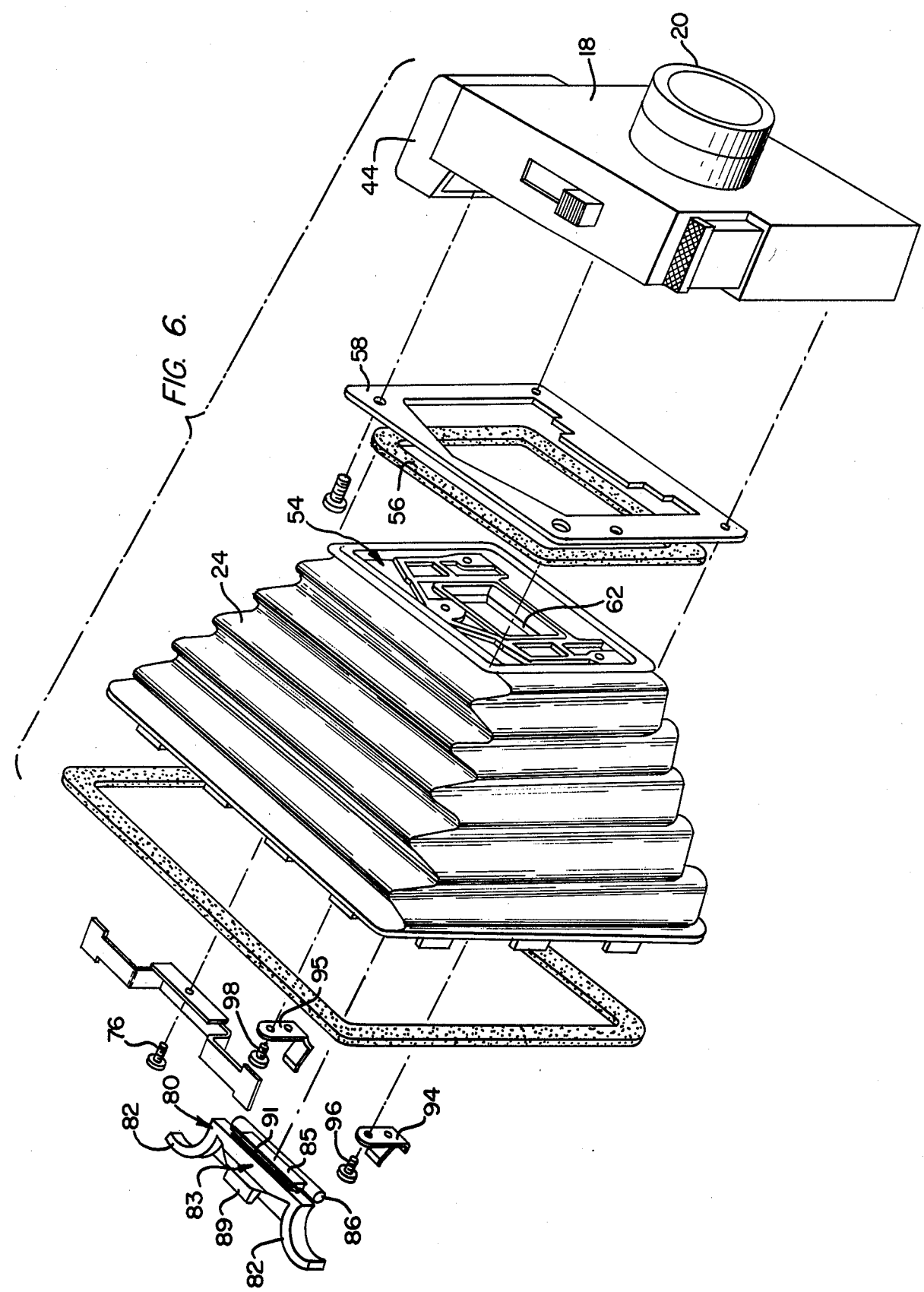

BATTERY MOUNT FOR COLLAPSIBLE CAMERAS

BACKGROUND OF THE INVENTION

This invention relates to photographic cameras and more particularly, it concerns collapsible bellows type cameras having a novel support for batteries used to power electrically operated equipment associated with such cameras.

In large film format photographic cameras, focusing distance between the film plane and the camera objective lens is commonly accommodated by a collapsible, light-tight bellows extending between a back housing in which the film is carried and a front shutter housing which supports the lens and other exposure control apparatus such as a shutter, aperture stopping means and the like. The bellows, typically of truncated rectangular pyramidal configuration, is pleated to allow the shutter housing to be moved from an operative position spaced with respect to the back housing or collapsed against the back housing for storage or carrying.

Electrical equipment associated with bellows cameras, such as exposure control systems, receptacles for flash illumination devices as well as circuitry for such apparatus is usually supported within the shutter housing along with the aforementioned apparatus. Since such equipment requires one or more batteries as a souce of electric energy and because of shutter housing movement with respect to the camera back housing, it is desirable to mount the batteries within or adjacent to the shutter housing to avoid the need for a flexible conductor, for example, extending between the batteries and the equipment contained by the shutter housing. Because of the limited space available within the shutter housing, however, it is difficult to accommodate any but specialized small batteries of a specific configuration. Such specialized batteries are objectionable from the standpoint that they are often not readily available and are limited in their electrical storage capacity to such an extent that their use is restricted to metering circuitry requiring minimal current loads.

Another problem associated with the mounting of batteries in photographic cameras, particularly where the camera is automated in a manner to permit its use by the most inexperienced amateur, arises out of a need for informing such amateurs that a battery is required for satisfactory camera operation. It is not uncommon, for example, for a casual photographic amateur to use a camera only after long periods of nonuse exceeding the shelf life of the batteries in the camera. Unless such an amateur is reminded of the need for batteries, he is likely to discover such need only after several unsuccessful attempts at taking pictures. This situation is even more aggravated if upon discovering a need for new batteries, such a user finds that the battery required is available only at a then closed specialized supplier of photographic equipment.

U.S. Pat. No. 3,511,146, issued May 12, 1970 to Patrick L. Finelli and Walter R. Lyon and commonly assigned with the present application, discloses an arrangement in a non-folding camera wherein batteries are disposed in a support hinged to an inside face of the exposure chamber to be disposed adjacent the camera's shutter housing. The support must be pivoted out of its battery retaining position to provide access needed for battery removal and/or replacement.

SUMMARY OF THE INVENTION

In accordance with the present invention, the space available within a collapsed camera bellows between the back of a shutter housing and the front of the camera back housing is utilized to enclose one or more standard penlight batteries in a position to be immediately and clearly visible when the back of the camera is open for loading film as well as directly accessible for battery replacement. Preferably, a pair of batteries are mounted within the bellows on the back of a frame member to which the front end of the bellows is secured, the front side of which is secured to the back side of the shutter housing. The batteries are nested one to each side of a central lens aperture and secured in place by a hinged clip. Electric terminals are supported by and extend through the frame member for proper connection to electrical apparatus in the shutter housing.

Among the objects of the present invention are therefore: the provision of an improved battery mount for photographic cameras; the provision of such a battery mount having particular utility in collapsible bellows-type cameras; the provision of such a battery mount for bellows cameras in which the batteries are clearly visible and readily accessible from the back of the camera when opened as for film loading; and the provision of such a battery mount which requires a minimum number of parts, which is inexpensive and yet which is highly effective in the retention of batteries within a photographic camera while at the same time facilitating battery replacement.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 6 is an exploded perspective view illustrating the relationship of the battery mounting components to other components of the camera with which it is used.

DETAILED DESCRIPTION OF THE PREFERRED EMBODIMENT

Figure 1:
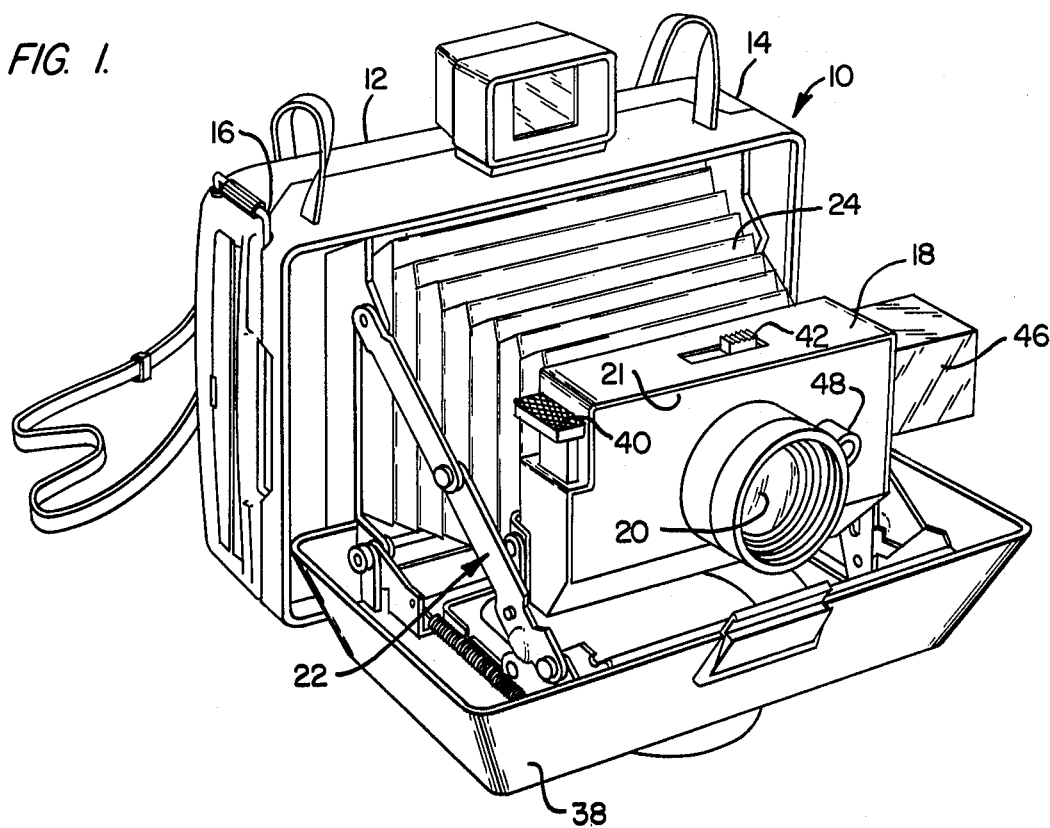
FIG. 1 is a perspective view of a bellows-type camera in an extended or operable condition and with which the battery mount of the present invention is particularly suited for use.
Figure 2:
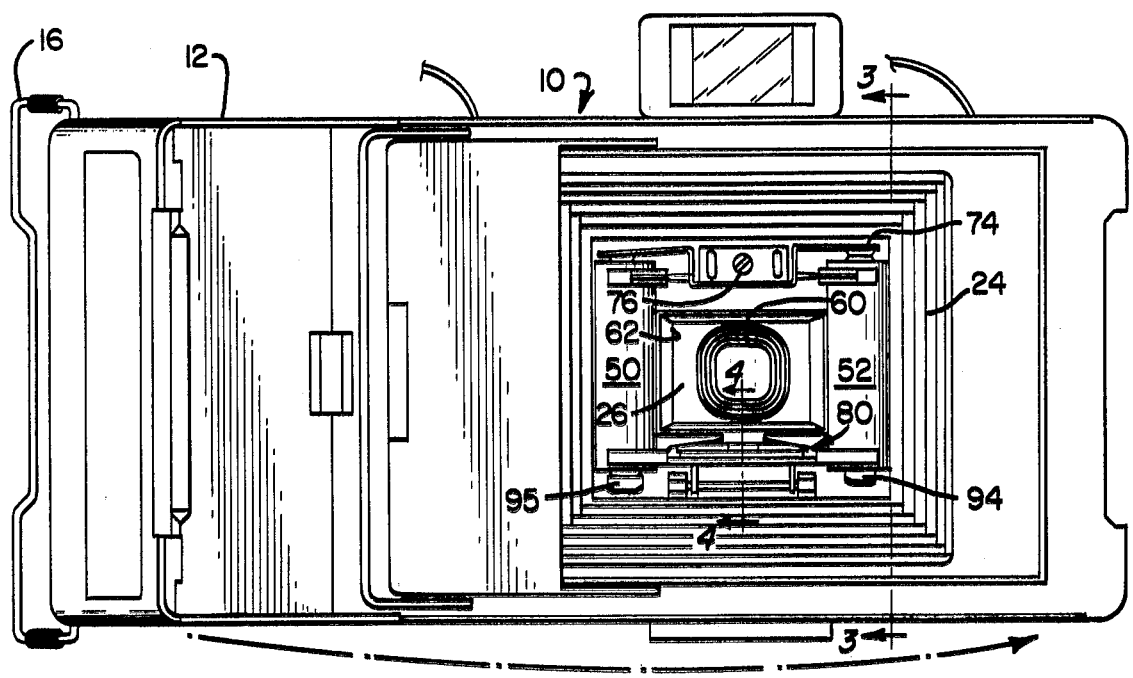
FIG. 2 is a rear elevation of the camera illustrated in FIG. 1 with the film housing cover in an open position.
Figure 3:
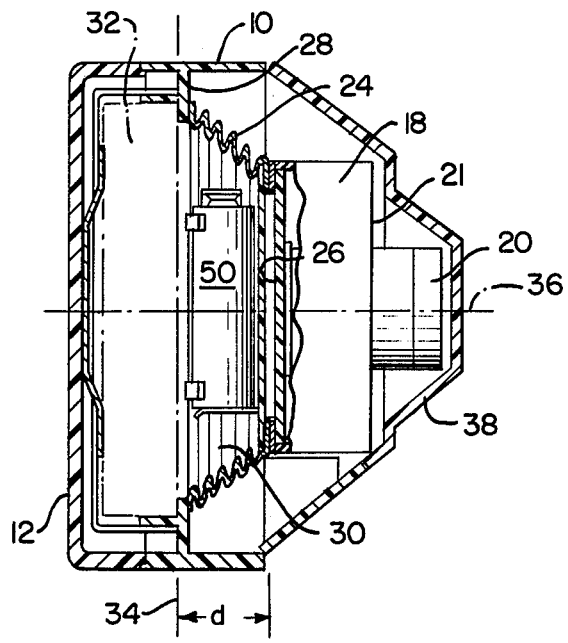
FIG. 3 is a cross section taken on line 3—3 of FIG. 2.

In FIGS. 1–3 of the drawings, a photographic camera incorporating the battery support of the present invention is shown to include a back or film housing 10 having an access cover 12 hinged at one end 14 and secured in a closed condition at the other end by suitable means such as a latch bail 16. A shutter housing 18 supports an objective lens 20 on its front face 21 and is movable between an extended or operative position as shown in FIG. 1 and a retracted position as shown in FIG. 3, for example, as a result of its being supported by the appropriate means such as a linkage assembly 22. A conventional collapsible bellows 24 extends between the back face 26 of the shutter housing 18 and a front face 28 of the film housing 10 to establish a light-tight chamber 30 between the shutter housing 18 and the film housing 10.

In the disclosed embodiment, the film housing 10 is of a type conventionally found in self-developing cameras and as such, is capable of supporting a film pack 32 in a position such that each successive film sheet contained therein will be positioned in a film plane 34 centered on the camera optical axis 36 established by the lens 20 and facing in the direction of the shutter housing 18. Also in the disclosed embodiment, a front cover member 38 is pivotally mounted from the front of the film housing 10 and connected to the linkage 22 for movement from the open position shown in FIG. 1 to a closed position (FIG. 3) over the lens 20 and shutter housing 18. Thus it will be noted that although the shutter housing 18 is spaced forwardly of the film housing 10 by a substantial distance in the extended condition of the camera illustrated in FIG. 1 of the drawings, the position of the respective housings 10 and 18 in the collapsed condition illustrated in FIG. 3 close on one another to provide a reasonably compact assembly for carrying or storage. Also in the collapsed condition, it will be noted that the rear face 26 of the shutter housing 18 closes toward the film plane 34 such that in this condition, it is spaced from the film plane by a distance $d$, again as shown in FIG. 3.

In addition to the lens 20, the shutter housing 18 carries other equipment employed for exposure of a film presented at the film plane 34, such as a shutter actuator 40, a film speed selecting button 42 and a socket 44 (FIG. 6) for receiving an electronic flash unit, in this instance a conventional flash cube 46. Also the shutter housing contains various electrical equipment and circuitry which though not illustrated specifically would conventionally include power and synchronization circuitry for the flash cube 46 as well as electronic shutter timing means operative in response to light passing to a photocell (not shown) through a window depicted at 48 in FIG. 1 of the drawings. Thus the need for and utilization of electrical energy storage batteries in the camera will be evident at least to those skilled in the photographic art.

Figure 5:
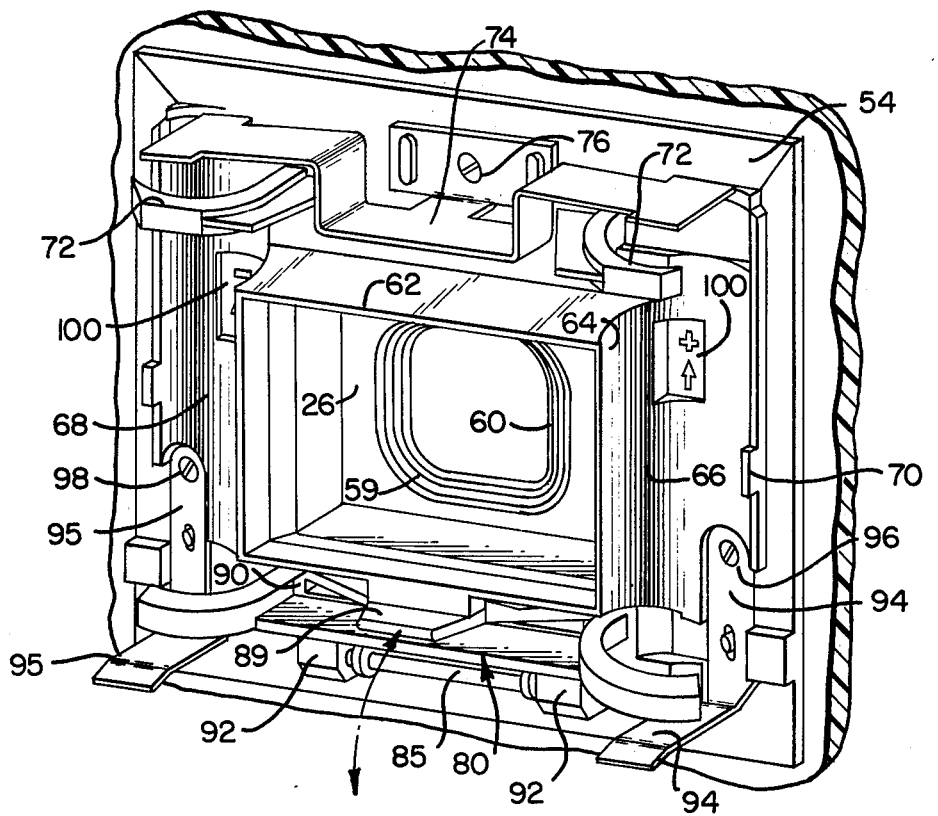
FIG. 5 is an enlarged fragmentary perspective view illustrating the battery support of the present invention.

The mounting and containment of storage batteries for supplying the energy requirements of the electrical equipment contained in or supported by the shutter housing 18 is accounted for by the present invention in a manner permitting adequate energy storage capacity using one or more batteries of standard size and in a manner such that the batteries are visible and readily accessible through the cover 12 of the film housing 10. As shown in FIGS. 2, 3, and 5 of the drawings, a pair of standard penlight batteries 50 and 52, preferably of a size conventionally designated "AA," are supported within the bellows 24 from a frame 54 secured to the rear face 26 of the shutter housing 18. As shown in FIG. 6 of the drawings, the front end of the bellows 24 is folded about the periphery of the frame 54 and secured by an adhesive light sealing gasket 56 to a frame-like member 58, in turn mounted against the shutter housing 18.

As shown in FIGS. 2 and 5, the rear face 26 of the shutter housing 18 is formed with a stepped recess 59 concentric with a lens aperture 60. The lens aperture is centered on the optical axis 36 and functions to delimit the maximum aperture stop for the lens 20. The frame 54, as may be seen in FIGS. 2, 5 and 7, is formed with a central opening circumscribed by a generally rectangular light or flare baffle 62 projecting rearwardly as an integral portion of the frame member 54. In the assembled camera, the baffle 62 is centered on the optical axis 36 and opposite exterior sides thereof are formed with semicylindrical surfaces 64 extending continuously about the back of the frame member to establish a pair of battery nests 66 and 68 thus oriented vertically and positioned laterally of the lens aperture 60 and of the light baffle 62, the curvature of these nests serving to facilitate the location of the batteries 50 and 52 in a forward position with respect to the shutter housing 18 and away from the film plane 34 when the camera is in its collapsed condition. The nests terminate at the outside in lugs 70 and join at their upper ends with circular bracket formations 72 having an inner radius complementing the size of the batteries to be used and extending to slightly more than 180° about the periphery of the batteries. A resilient conductive bus strip 74 is cantilevered from the rear face of the frame member 54 by a terminal screw 76 for electrical connection of the two batteries 50 and 52. It will be appreciated, therefore, that the batteries may be angularly positioned in the semicylindrical nests 66 and 68 and slid longitudinally thereof against the terminal strip 74 under the ring-like bracket members 72 in a manner to secure the upper ends of the batteries.

At the end of the nest, 66 and 68 opposite from the partial brackets members 72, or at the bottom of the nests in the disclosed embodiment, a releasable battery clip or retaining means 80 is provided and illustrated in FIGS. 2–6 of the drawings. As shown in FIG. 6, the clip 80 is a one-piece molding having a pair of oppositely disposed battery engaging portions in the form of partial rings 82 having an inside radius to complement the shape of the batteries to be used and connected by a bar portion, 83. As shown most clearly in FIG. 4, the cross-sectional configuration of the bar portion 83 defines a web 84 joining integrally at opposite ends with and reinforcing the battery engaging portions 82. A pivot flange 85 depends from the forward edge of the web 84 and carries oppositely extending pivot pin portions 86 at the lower edge thereof. Spaced from the web 84 on the side thereof opposite from the pivot flange 85 is an integral latching flange 87 having a central latching dog portion 88 and an extending actuating tab portion 89. The base of the latching flange 87 is joined with the web 84 by space leg portions 90 on opposite ends of a slot 91. The pin portions 86 are received by bearing bosses 92 (see FIG. 5) projecting from the rear face of the frame member 54.

Figure 4:
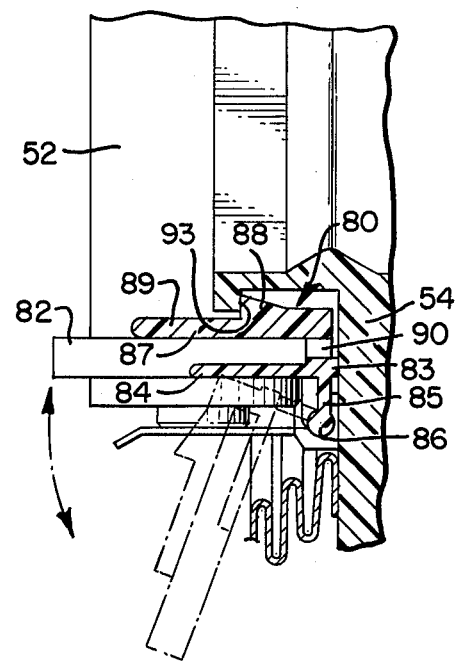
FIG. 4 is an enlarged fragmentary cross section taken on line 4—4 of FIG. 2.

Thus it will be seen in FIG. 4 that the clip 80 will be secured on the axis defined by the pin portions 86 and the bearing bosses 92 so that the latch dog 88 will engage a depending shoulder 93 along the lower edge of the light baffle 62. Because the latching flange 87 is supported only at its ends by the leg portions 90, depression of the tab portion 89 will effect a deflection of the flange 87 and disengagement of the latch dog 88 from the depending shoulder 93 to release the clip 80 for pivotal movement to a retracted position depicted by phantom lines in FIG. 4 of the drawings. Also, because the ring-like battery engaging portions lie in a plane spaced from the pivotal axis of the clip, the portions thereof in engagement with the batteries 50 and 52 will be moved through an arc clearing the end of the batteries and when in the retracted position, allow ample space by which the lower ends of the batteries may be grasped manually and removed from the battery nests.

Within each of the battery nests 66 and 68 at the end thereof opposite from the connecting strip 74 are battery terminal strips 94 and 95 secured in place by terminal screws 96 and 98 which may extend through the frame 54 to connect mechanically and electrically with appropriate terminals (not shown) of electric circuitry within the shutter housing 18. Also, each of the nests 66 and 68 is provided with indicia 100 by which the orientation of the batteries 52 and 54 will correspond properly to the polarity of the circuit in which they are connected.

The arrangement of the bus strip 74, terminal screw 76, terminal strips 94, 95 and contacting terminal screws 96 and 98 thus permits circuits within the shutter housing to be supplied with current from the batteries at two voltage levels. In particular, connection across the screws 95 and 96 will continue the voltage of the batteries or provide 3.0 volts in the case of two 1.5 volt "AA" batteries. A circuit requiring only 1.5 volts may be accommodated by connection across one of the screws 96 or 98 and the screw 76.

It will be appreciated that the batteries 50 and 52, while supported in the nests 66 and 68, will not interfere in any way with the passage of light through the lens 20, the aperture window 60, past the light baffle 62 to the film plane 34. As may be seen by reference to FIG. 2 of the drawings, however, both batteries are clearly visible when the cover 12 of the film housing 10 is open and the film pact 32 removed. Moreover, when the shutter housing 18 is collapsed to the position shown in FIGS. 2 and 3 of the drawings, the latch the latch handle 90 of the clip 84 is readily accessible for removal and replacement of the batteries. Further, and as is shown most clearly in FIG. 3 of the drawings, the maximum outside dimensions of the mounted batteries is less than the distance $d$ between the back wall of the rear surface 26 of the shutter housing 18 and the film plane 34. Hence the batteries will not interfere physically in any way with a film pace 32 loaded in the camera. It will be recognized that the curvatures of the surfaces 64 contribute to this compact arrangement.

Thus it will be appreciated that by this invention there is provided an improved battery mount for photographic cameras particularly of the collapsible bellows type and by which the aforementioned objectives are completely fulfilled. Since it will be apparent to those skilled in the art that various modifications and/or changes may be made in the embodiment as disclosed herein, it is expressly intended that the foregoing description is illustrative of a preferred embodiment only, not limiting, and that the true spirit and scope of the present invention be determined from the appended claims.

We claim:

1. A photographic camera comprising:
   a film housing having front and rear faces and including a displaceable rear cover for facilitating the insertion of a film pack into, and its subsequent removal from, said film housing;
   a shutter housing assembly having front and rear faces and containing means including electrical equipment for exposing film, said assembly including a central lens aperture opening through the rear face thereof;
   means for supporting said shutter housing assembly for movement between an extended operative position spaced with respect to said film housing and a retracted position located towards said film housing from said operative position; and
   a collapsible bellows to establish a light-tight chamber between the rear face of said shutter housing assembly and the front face of said film housing;
   said shutter housing assembly including means for supporting an elongated electric battery within said chamber with the battery extending parallel to the film plane of said camera and in fixed relation to, and closely adjacent, said rear face of said shutter housing assembly, the batteries and said battery supporting means being spaced forwardly of but immediately adjacent the camera's film plane when said shutter housing assembly is in its said retracted position so that the batteries are immediately visible and directly accessible at such times as said displaceable cover is opened, said battery supporting means comprising:
   a frame secured by a light-tight seal about the periphery thereof to said bellows, said frame defining a rearwardly projecting light baffle about said lens aperture and a pair of battery nests on opposite sides of said light baffle;
   a fixed bus strip positioned beyond said light baffle at one end of and extending between said nests, and a battery terminal at the other end of each of said nests;
   fixed battery retaining brackets respectively located adjacent one end of each said nest to retain one end of a battery positioned in each of said nests; and
   a releasable clip positioned beyond said light baffle at said other end of each said nest to retain the opposite ends of batteries positioned therein, said releasable clip comprising a one-piece pivotable member having a bar portion supporting a pair of ring-like battery engaging portions at opposite ends thereof.

2. The apparatus recited in claim 1 wherein said bar portion defines a web in the plane of said ring-like portions, said web portion having front and rear edges, and a pivot flange extending perpendicularly from the front edge of said web and supporting pivot means for said clip spaced from the plane of said ring-like members.

3. The apparatus recited in claim 2 wherein said bar member further defines a latch flange parallel to said web, said latch flange having a latch dog formation to engage a shoulder on the exterior of said light baffle.

4. The apparatus recited in claim 3 wherein said latch flange extends rearwardly beyond said latch dog as a release tab.

* * * * *